United States Patent [19]
Odinak et al.

[11] Patent Number: 5,977,865
[45] Date of Patent: Nov. 2, 1999

[54] BIT ENCODING IN HOME CONTROL SYSTEMS

[75] Inventors: Gilad Odinak, Bellevue; Nigel S. Keam; Craig S. Ranta, both of Redmond, all of Wash.

[73] Assignee: Microsoft Corporation, Redmond, Wash.

[21] Appl. No.: 08/874,044

[22] Filed: Jun. 12, 1997

[51] Int. Cl.[6] .................................................. H04M 11/04
[52] U.S. Cl. ................... 340/310.01; 340/310.02
[58] Field of Search ............... 340/310.01, 310.02; 375/238, 239, 259

[56] References Cited

U.S. PATENT DOCUMENTS

| | | | |
|---|---|---|---|
| 4,012,704 | 3/1977 | Jagoda et al. | 340/310.01 |
| 4,357,605 | 11/1982 | Clements | 340/310.01 |
| 4,633,218 | 12/1986 | Palsgrove et al. | 340/310.2 |
| 5,018,167 | 5/1991 | Perelman | 340/825.63 |

*Primary Examiner*—Edward Lefkowitz
*Attorney, Agent, or Firm*—Lee & Hayes, PLLC

[57] ABSTRACT

A system for electronic communications using electrical power lines in a building includes a plurality of components that are connected for communications among themselves through the electrical power lines. A control transmitter is associated with at least one of the components for transmitting a data stream over the electrical power lines as a series of state changes. The data stream has a sequence of binary elements that each have one of two possible binary values. The control transmitter is configured to encode the binary elements as a series of three different state intervals on the transmission medium, depending on the value of the current binary element, the immediately preceding binary element, and the immediately following binary element. A control receiver is configured to decode the original data stream based on the state intervals. The encoding scheme allows a bit rate that is equal to the baud rate of the transmission medium.

50 Claims, 3 Drawing Sheets

BIT ENCODING IN HOME CONTROL SYSTEMS

TECHNICAL FIELD

This invention relates to automated home control systems and to methods of communicating between distributed components of a home control system using existing electrical wiring in a house or other building.

BACKGROUND OF THE INVENTION

A modern home potentially has a great number of sophisticated electrical systems, including security systems, audio/video systems, telephone systems, intercom systems, etc. All of these systems require interconnecting wiring. A security system for example, requires wiring between sensors, controllers, and alarm devices. Audio/video systems require a maze of wiring between different active components, as well as wiring to as many as six speakers in a single room. Telephone and intercom systems similarly require wires between stations.

When systems such as these are installed during construction of a new home, wiring can be installed with little trouble. When adding systems to an existing house, however, installation of wiring often requires significant effort.

Because of the difficulty of installing interconnecting wiring in an existing home, there are many available products that utilize existing AC power distribution wires or lines in a house for communications of various types. Products such as these work by modulating a signal on the power lines at a frequency that is well above the conventional 60 Hz frequency of electrical power carried by the distribution lines.

The so-called "X10" protocol is popular for providing simple communications between common electrical components such as security components, switchable power receptacles, dimmers, and other power control modules. The X10 system provides basic functionality between command modules and receivers of various types. In general, however, this system is limited to on/off and dimming capabilities.

A variety of other products are also available. Some home intercoms, for example, modulate an analog audio signal on the power lines to provide audio communications between two different rooms in a house, without requiring dedicated wiring. Extension telephones are available that utilize existing power lines rather than requiring the installation of telephone cable. Adapters are also available for transmitting video and stereo audio over existing power lines in a house.

There are a number of different protocols used for communications over existing building wiring. The relatively simple X10 communications protocol is one example. An X10 signal is composed of a series of 5 volt, 121 kHz pulses having a duration of 1 millisecond, positioned at zero crossings of the 60 Hz AC power signal. Each pulse corresponds to a binary 1, and the absence of a pulse corresponds to a binary 0. A single X10 command consists of a 22 bit word obtained from eleven complete cycles of the AC power signal.

All X10 receivers plugged into the household power lines will see all transmitted signals. However, each command carries the address of its transmitter. A receiver responds to only those commands that have the address of the receiver. Thus, control modules such as switch modules can be paired with receiver modules by manually setting both addresses to the same value. Up to 256 addresses are available. Computer interfaces are available for allowing a computer to issue commands to different X10 receivers over home power lines.

More sophisticated protocols have also been used to communicate using existing power lines. Electrical protocols in most such systems use a modulation carrier that is significantly higher in frequency than 60 Hz. Data formatting in the more sophisticated systems is similar or identical to networking protocols, in which discrete packets of digital information are sent from an originating device to a destination device using a common carrier channel or frequency.

The present invention results from an effort to reduce the complexity and cost of transmitters and receivers used to communicate digital data over electrical power lines. This invention is particularly related to a method of encoding binary data onto a frequency carrier that is modulated between two line states referred to as "mark" and "space" line states. When using such a scheme, it is desirable to maintain a 50% duty cycle between mark and space states. This is desirable to properly bias the receiver's demodulator. Although schemes are available for maintaining a 50% duty cycle with arbitrary data, such schemes typically require a baud rate that is twice that of the actual bit rate. Baud rate is defined as the maximum number of line state changes that occur on a transmission medium in one second—it is the reciprocal of the length (in seconds) of the shortest element in the signaling code, which is referred to as a "baud."

Manchester II or biphase encoding provides a 50% duty cycle by switching polarity on each bit. A logical "1" is transmitted with a signal that is high for one-half a bit period and low for one-half a bit period. Similarly, a logical "0" is transmitted with a signal that is low for one-half a bit period and high for one-half a bit period. Since the data signal spends an equal amount of time in the high a low state, the average value is zero and no DC component is transmitted. This is critical in transformer coupled wired networks such as Ethernet and the MIL-STD-1553B avionics bus systems, to avoid saturation of the transformer. Unfortunately, this encoding method requires twice the bandwidth of codes which transmit only whole bit-period pulses, and so is not efficient for power line transmission.

Another popular code is Miller or MFM coding, used in magnetic media. Miller coding encodes a logical "1" as a transition in the middle of a bit cell. A logical "0" is encoded as no transition, except if the previous value was a zero, in which case the signal switches polarity at the beginning of the bit cell. Miller coding transmits one bit per baud and has no average DC component, but a continuous sequence such as "011011011" can transmit a short-term DC offset. Miller coding has no provisions for synchronization, so it requires a bit clock for recovery and this makes it undesirable for power line transmission.

One significant advantage of the invention is that it maintains a close to 50% duty cycle (worst case duty cycle can be 33%, but average is much closer to 50%) while achieving a bit rate equal to the baud rate. Another advantage is that data can be easily distinguished from noise. It is also self-synchronizing, does not require a clock for demodulation, and provides a special synchronization symbol, so beginnings and endings of messages can be easily detected. These characteristics make a code that is ideal for RF transmission, where bandwidth is limited, demodulation clocks are not available, DC response is difficult to provide, and transmitter/receiver warm up and cool down intervals frequently generate data errors. A further advantage is that the invention allows collision avoidance without requiring dedicated carrier sense circuitry or a dedicated CPU.

SUMMARY OF THE INVENTION

A system for electronic communications using electrical power lines in a building includes a plurality of components that are connected for communications among themselves through the electrical power lines. A control transmitter is associated with at least one of the components, for transmitting a data stream over the electrical power lines as a series of state changes. The data stream has a sequence of binary elements that each have one of two possible binary values represented herein as x and y. The control transmitter is configured to encode the binary elements as a series of a, b, and c state intervals on the power lines as follows:

- if the binary element immediately preceding a current binary element has a value of x, the current binary element is encoded as an a or b state interval depending on the value of the current binary element.
- if the binary element immediately preceding the current binary element has a value of y and the current binary element has a value equal to a first of the possible binary values, the current binary element is encoded as an a state interval.
- if the binary element immediately preceding the current binary element has a value of y and the current binary element has a value equal to a second of the possible binary values, the current binary element and the immediately following binary element are encoded as a b or c state interval depending on the value of the immediately following binary element.

The a state interval has a duration of 1 baud. The b state interval has a duration of 1½ baud. The c state interval has a duration of 2 baud.

This scheme allows a bit rate equal to the baud rate, while still maintaining a close to 50% duty cycle.

DETAILED DESCRIPTION

Figure 1:
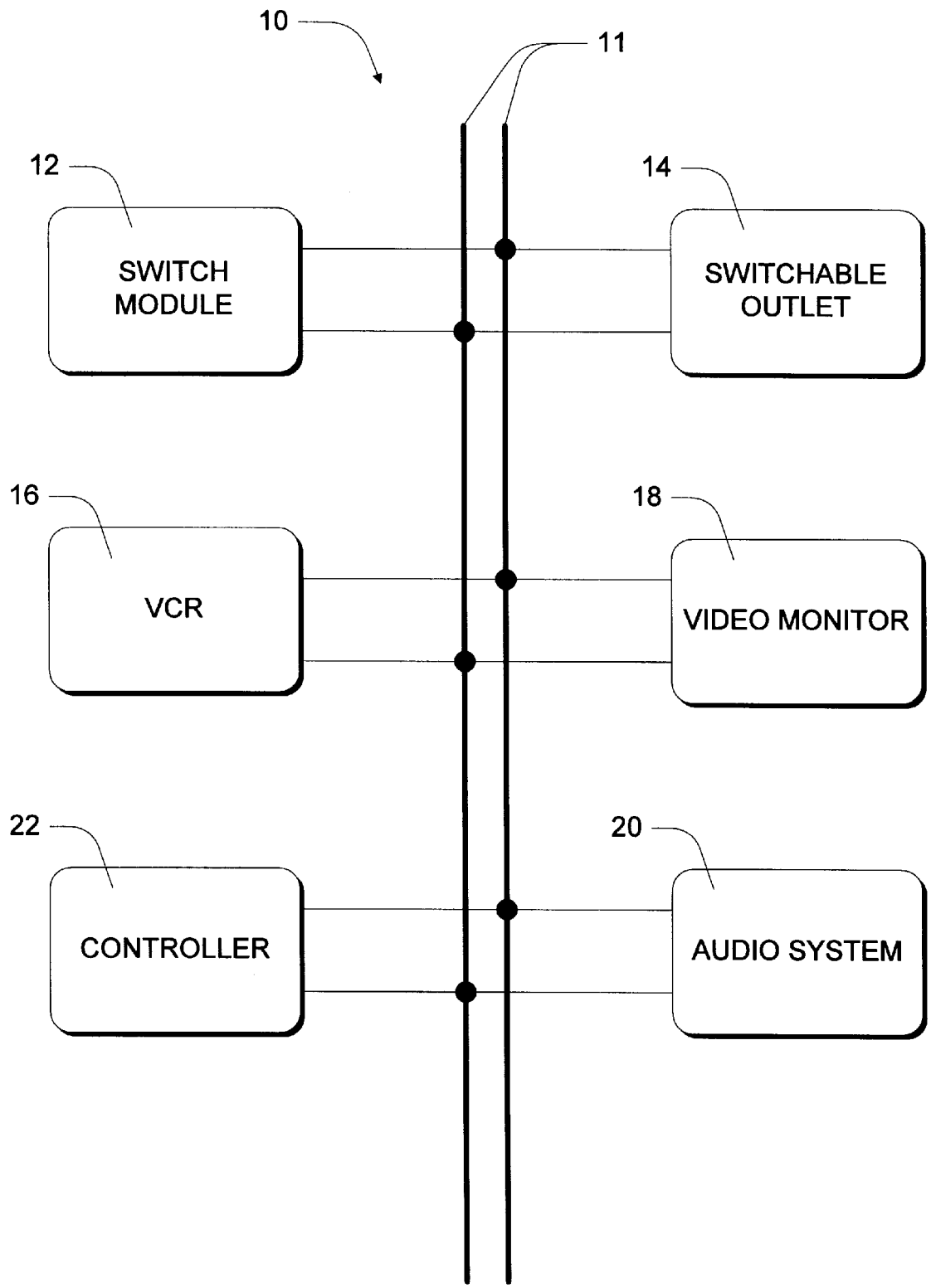
FIG. 1 is a block diagram of a home control system in accordance with the invention.

FIG. 1 shows an example of a home control system 10 that uses electrical power lines 11 for communications. The system comprises a plurality of electrical components that are connected for communications among themselves through the electrical power lines. Such components comprise, for example, a switch module 12, a switchable outlet 14, a VCR (video cassette recorder) 16, a video monitor 18, an audio system 20, and a controller 22. These components have control transmitters and/or control receivers, thus allowing the components to communicate digitally with each other on a digital communications channel. Some of the components are also analog signal sources, while others are analog signal receivers. The analog signal sources and receivers communicate using one or more high-bandwidth communications channel. Such high-bandwidth communications channels are described in a co-pending U.S. Patent Application by Gilad Odinak entitled "Automated Home Control Using Existing Electrical Lines as a Communications Medium," filed concurrently with this application, which is hereby incorporated by reference.

Figure 2:
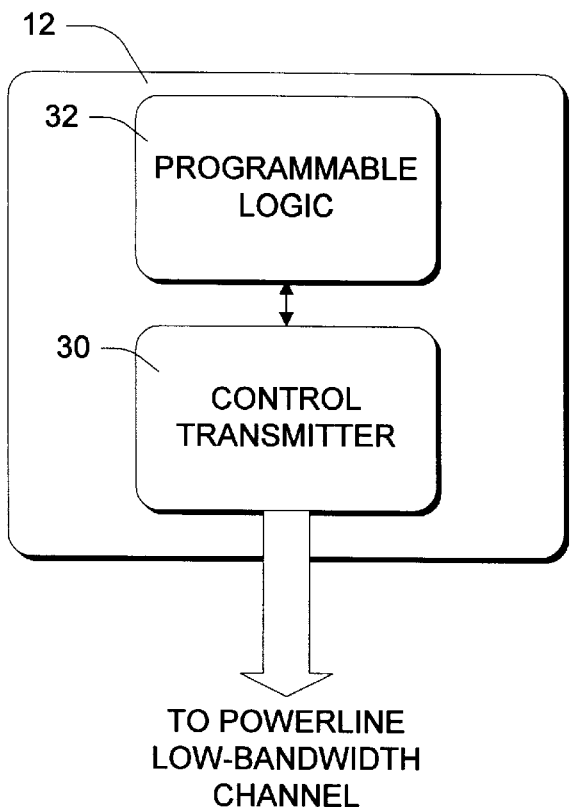
FIG. 2 is a block diagram of a switch module in accordance with the invention.

FIG. 2 shows an example of a simple power control component such as switch module 12. A component such as this has an associated control transmitter 30 that is connected to transmit control data using a frequency channel on the electrical power lines. Switch module 12 also has some type of programmable logic 32 such as an inexpensive microprocessor or microcontroller in conjunction with computer-readable program storage medium such as electronic, randomly-addressable memory. The program storage medium contains instructions that are executable by the microprocessor to perform the encoding and transmission steps described below.

The programmable logic 32 is connected and configured or programmed to supply digital transmission data to control transmitter 30. In response, transmitter 30 modulates the data on the communications channel. The particular high-level control data format is described in a co-pending U.S. Patent Application by Gilad Odinak and Nigel Keam entitled "Message Formatting, Authentication, and Error Detection in Home Control Systems," filed concurrently with this application, which is hereby incorporated by reference. In this case, switch module 12 transmits simple on/off commands.

Figure 3:
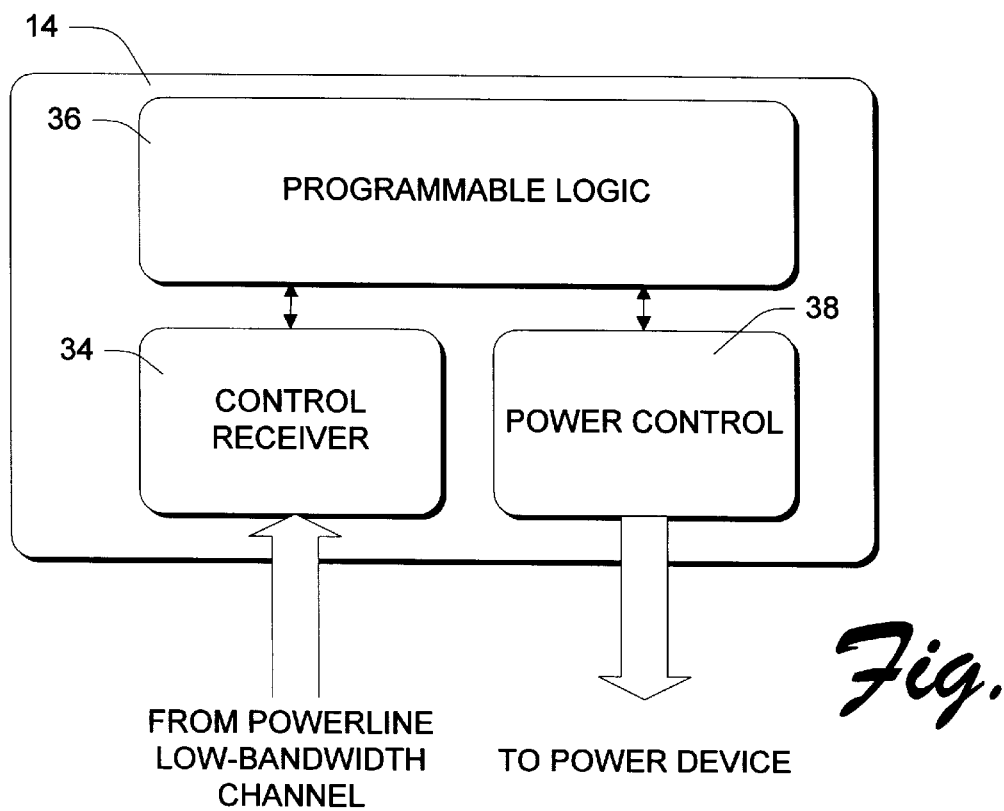
FIG. 3 is a block diagram of a switchable outlet in accordance with the invention.

FIG. 3 shows an example of a simple receiver component such as switchable outlet 14. A component such as this has an associated control receiver 34 that is connected to receive control data using the communications channel over the electrical power lines. Again, the receiver is implemented using conventional circuitry such as commonly used to implement wireline and/or wireless communications systems, with precautions taken to protect against power line surges and noise. Switchable outlet 14 also has programmable logic 36, similar or identical to that described above, as well as power control circuitry 38. Data is demodulated from the low-bandwidth channel by receiver 34 and provided to programmable logic 36. Power control circuitry 38 is responsive to programmable logic 36 to selectably provide power to a power outlet or integrated component (not shown). The control data format mentioned above allows an installer to assign virtual circuit numbers to each control component. A receiver is configured to respond only to commands having its virtual circuit number.

A typical system has a plurality of components using control transmitters and receivers, and a plurality of components using analog signal transmitters and receivers. All components use a common communications channel for relatively simple control communications. However, the analog signal sources and receivers use different high-bandwidth analog channels, with correspondingly different carrier frequencies (as described in the U.S. Patent Application entitled "Automated Home Control Using Existing Electrical Lines as a Communications Medium," referenced above). For simplicity, the invention is described in terms of a single transmitter and receiver pair. The invention described herein concerns the low-level encoding of digital control data streams or messages onto the transmission medium.

Control transmitter 30 is configured to transmit a data stream over the electrical power lines of a building, using a series of state changes. In the preferred embodiment of the invention, the transmitter uses two different frequencies on the power lines, corresponding to mark and space states, respectively. As an example, the mark frequency might be 294 KHz, and the space frequency might be 306 Khz. This is a conventional way of modulating a carrier frequency to represent binary data.

The data stream itself is a sequence of binary bits or elements that each have one of two possible binary values (0 and 1), represented herein as x and y. Except for the initial bit of the stream, each bit is preceded by another bit. Except for the last bit of the stream, each bit is followed by yet another bit.

The control transmitter is programmed or otherwise configured to encode the bits of the data stream as a series of state intervals. In this description, a state interval is the time between state changes on the communication channel: the duration of a mark or a space. In the preferred embodiment of the invention, three different intervals are used, and are referred to herein as a, b, and c state intervals. The a state interval is approximately equal in length to a predetermined duration that is preferably a single "baud." A baud is defined as the reciprocal of the baud rate of the communications channel, and is thus the shortest available state interval. The b state interval is larger than the a interval by 50%. Thus, it is approximately equal to 1½ times a single baud (1½ baud). The c state interval is larger than the a interval by 100%. Thus, it is approximately equal to 2.0 times a single baud (2 baud). Utilizing a state interval that is a non-integer multiple of a single baud allows encoding data at a bit rate equal to the baud rate, while still maintaining an approximately 50% duty cycle.

Figure 4:
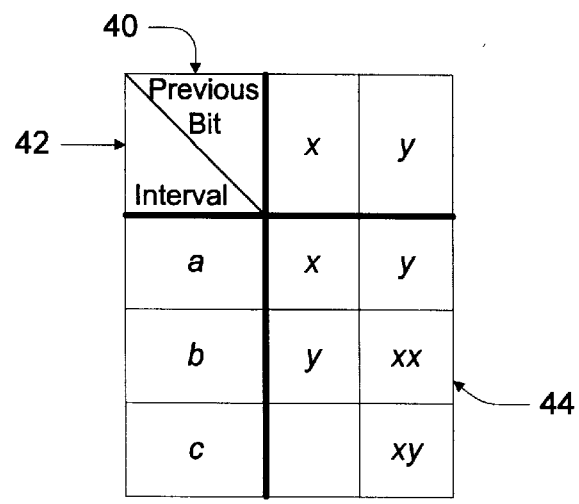
FIG. 4 is a table illustrating an encoding and decoding scheme in accordance with the invention.

FIG. 4 is a table that is used to encode sequential bits of the data stream into corresponding state intervals. The scheme implemented by this table relies not only on the current bit that is to be encoded, but also on the immediately previous element that has already been encoded.

The table of FIG. 4, the has a left index column 40 that indicates which of the three state intervals is used to encode the current bit. A top index row 42 indicates the value of the bit that immediately precedes the current bit. Table elements 44 indicate the value of the current bit, and in two cases the value of the bit following the current bit.

To encode the current bit, a single row is chosen from the table with reference to the value of the current bit(s) and the previously encoded bit. First, a column is chosen based on the value of the previously encoded bit (using top index row 42). Then, a row is chosen based on the value of the current bit (using table elements 44 in the chosen column). In some cases, the current bit and the immediately following bit are used to select an appropriate row in the chosen column.

The table implements the following encoding scheme:

If the current bit has a value of x and the immediately preceding bit has a value of x, the current bit is encoded as an a state interval.

If the current bit has a value of y and the immediately preceding bit has a value of x, the current bit is encoded as a b state interval.

If the current bit has a value of y and the immediately preceding bit has a value of y, the current bit is encoded as an a state interval.

If the current bit has a value of x, the immediately preceding bit has a value of y, and the bit immediately following the current bit has a value of x, the current bit and the immediately following bit are encoded as a single b state interval.

If the current bit has a value of x, the immediately preceding bit has a value of y, and the immediately following bit has a value of y, the current bit and the immediately following bit are encoded as a single c state interval.

To avoid ambiguity, the initial bit is assumed to be preceded by a y value.

Figure 5:
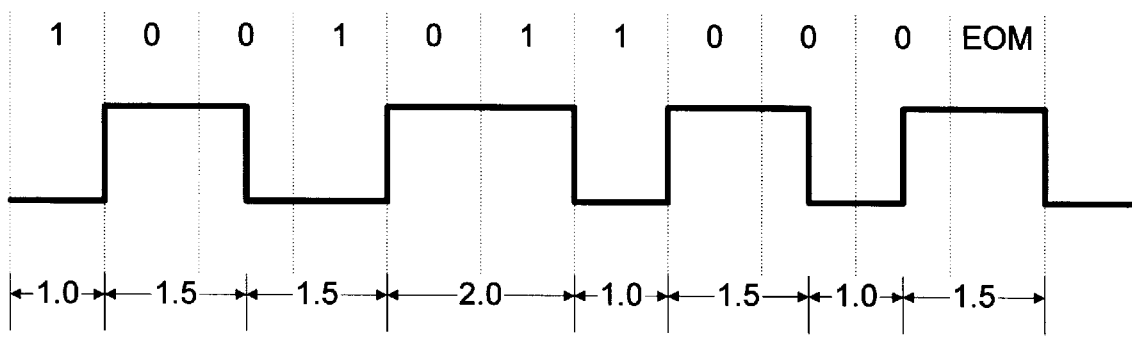
FIG. 5 is a waveform diagram illustrating an encoded bit sequence in accordance with the invention.

FIG. 5 illustrates an actual application of this scheme to a short data stream comprising bits having values 1, 0, 0, 1, 0, 1, 1, 0, 0, and 0. In this example (as in the actual embodiment of the invention), x is considered equivalent to 0, and y is considered equivalent to 1. The bit values are shown along the top of a waveform that represents the state of transmission medium capable of indicating a high or mark state and a low or space state. When the waveform is high, a mark is being transmitted. When the waveform is low, a space is being transmitted.

The initial bit has a value of 1, and the preceding bit is assumed to also have a value of 1. Referring to the table of FIG. 4 (previous bit y and current bit y), the bit is encoded as an a state interval, having a duration of 1 baud. Each interval duration is indicated below the waveform of FIG. 5.

The next bit has a value of 0. Again referring to the table of FIG. 4 (previous bit y and current bit x), this bit is encoded as either a b or a c state interval, depending on the value of the following bit. In this case, the following bit has a value of 0, so these two bits (the current bit and the following bit, having values 00 or xx in FIG. 4) are encoded as a single b state interval. The b state interval has a duration of 1.5 baud.

The next bit (the fourth bit) has a value of 1 (since two bits—0 and 0—were encoded by the previous state interval). The previous bit had a value of 0 (x) so this current bit is encoded as a b state interval (having a duration of 1.5).

The following bit (the fifth bit) has a value of 0. Since the previous bit had a value of 1, reference is made to the right-most column of the table of FIG. 4. Based on the current bit alone, either an a or a b state interval is called for, depending on the value of the immediately following bit. In this case, the following bit has a value of 1, so the two bits together have a value of 01 (xy). Thus, these two bits are encoded as a single c state interval having a duration of 2 baud.

The remaining bits are encoded similarly.

The control receiver is programmed or otherwise configured to decode the bits of the data stream from the series of state intervals. The table of FIG. 4 can be used again for decoding the state intervals by first identifying the row containing the current state interval (a, b, or c) and then identifying the column that matches the bit that was just previously decoded. Again, the initial bit is assumed to have been preceded by a y or 1 value. The data contained at the intersection of the identified row and column is the data represented by the current state interval.

The table of FIG. 4 implements the following decoding scheme:

if the current state interval is an a state interval and the previously decoded bit had a value of x, the current state interval is decoded as a bit having a value of x;

if the current state interval is a b state interval and the previously decoded bit had a value of x, the current state interval is decided as a binary element having a value of y;

if the current state interval is an a state interval and the previously decoded bit had a value of y, the current state interval is decoded as a binary element having a value of y;

if the current state interval is a b state interval and the previously decoded bit had a value of y, the current state interval is decoded as a pair of binary elements, wherein each element of the pair has a value of x;

if the current state interval is a c state interval and the previously decoded bit had a value of y, the current state interval is decoded as a pair of binary elements, wherein a first of the elements has a value of x and a second of the elements has a value of y.

Decoding the waveform of FIG. 5 is an elementary exercise using this scheme.

To conserve power and to allow other transmitters to use the same frequencies on the common power lines, the transmitter does not continue to transmit a carrier frequency between messages. Rather, the transmitter is active only while transmitting messages from its associated component.

To signal the beginning of a message or data stream, the control transmitter is configured to impose a d state interval on the transmission medium immediately preceding the actual bits of the data stream. The d state interval is longer than any one of the a, b, and c state intervals. In the preferred embodiment of the invention, the d state interval is approximately equal to 2½ baud.

Figure 6:
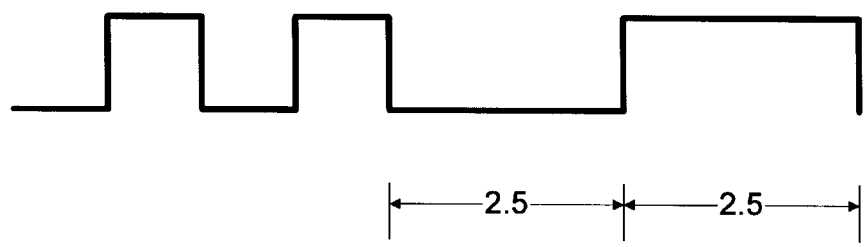
FIG. 6 is a waveform diagram illustrating a message preamble in accordance with the invention.

FIG. 6 shows a preferred message or data stream preamble. In a home control system such as the one described herein, individual messages between components start with such a preamble, which is needed to properly bias the receiver's demodulator. The preamble comprises several line state changes. The last state in the preamble is always a mark and lasts 2.5 baud. To preserve a 50% duty cycle, the space preceding the last mark of the preamble has a length equal to 2.5 baud.

The preamble allows receivers to easily detect the beginnings of messages. Since the time between state changes is bound, a receiver can start the data signal at any time and quickly tell when a message is being received by measuring the time between line state changes. When no transmission is present, the background noise typically causes line changes having durations much shorter (or longer) than legal state changes.

Furthermore, there is no need to maintain a period of silence between messages to avoid message collisions. To avoid collisions, a potential transmitter listens until invalid line state changes are detected, then waits for random (bound) time period and starts transmission. It then waits for a reply, and repeats if no reply. Waiting for invalid line state changes guarantees that the transmitter will not start transmission while another device is transmitting. The random delay decreases the chance that two waiting transmitters will collide with each other.

Two end-of-message (EOM) bits is used at the end of each data stream or message. The first EOM bit is always a 1, and allows a receiver to detect the duration of the last state interval. The second EOM bit can be either binary value. The second EOM bit simply keeps the transmitter on long enough for the receiver to recognize the first EOM bit.

In the home control system that forms the environment of this invention, the invention allows short messages to be sent between different pairs of components with relatively inexpensive and simple hardware. As mentioned above, there is no need for dedicated carrier detection circuitry. The start of a message can be detected by detecting a mark state having a length of 2.5 baud. The end of a message is indicated by any state interval of less than 1 baud or more than 2 baud. Similarly, noise can be easily detected as any state interval less than 1 baud and greater than 2.5 baud. Most importantly, the encoding and decoding scheme described herein maintains an approximately 50% duty cycle while also maintaining a bit rate equal to the baud rate of the transmission medium.

Although the invention has been described in language more or less specific as to structural and methodological features, it is to be understood that the invention is not necessarily limited to the specific features or steps described. Rather, the specific features and steps are disclosed as preferred forms of implementing the invention.

We claim:

1. A system for electronic communications using electrical power lines in a building, comprising:

a plurality of components that are connected for communications among themselves through the electrical power lines;

a control transmitter associated with at least one of the components for transmitting a data stream over the electrical power lines as a series of state changes, the data stream having a sequence of binary elements that each have one of two possible binary values represented herein as x and y, wherein each binary element is immediately preceded by another binary element and immediately followed by yet another binary element;

wherein the control transmitter is configured to encode the binary elements as a series of state intervals on the power lines by encoding at least some pairs of binary elements as single state intervals selected from different available state intervals.

2. A system for electronic communications using electrical power lines in a building, comprising:

a plurality of components that are connected for communications among themselves through the electrical power lines;

a control transmitter associated with at least one of the components for transmitting a data stream over the electrical power lines as a series of state changes, the data stream having a sequence of binary elements that each have one of two possible binary values represented herein as x and y, wherein each binary element is immediately preceded by another binary element and immediately followed by yet another binary element, wherein the control transmitter is configured to encode the binary elements as a series of a, b, and c state intervals on the power lines as follows:

if the binary element immediately preceding a current binary element has a value of x, encoding the current binary element as an a or b state interval depending on the value of the current binary element;

if the binary element immediately preceding the current binary element has a value of y and the current binary element has a value equal to a first of the possible binary values, encoding the current binary element as an a state interval;

if the binary element immediately preceding the current binary element has a value of y and the current binary element has a value equal to a second of the possible binary values, encoding the current binary element and the immediately following binary element as a b or c state interval depending on the value of said immediately following binary element.

3. A system as recited in claim 2, wherein the control transmitter is further configured to impose a d state interval on the power lines immediately preceding the data stream to signal the beginning of the data stream, wherein the d state interval is longer than any one of the a, b, and c state intervals.

4. A system as recited in claim 2, further comprising:

a control receiver associated with at least one of the components for receiving the data stream over the electrical power lines;

wherein the control receiver is configured to decode individual binary elements from the state intervals as follows:

if the previously decoded binary element has a value of x, decoding the current state interval as a binary element having a value of x or y depending on whether the current state interval is an a state interval or a b state interval;

if the previously decoded binary element has a value of y and the current state interval is an a state interval, decoding the current state interval as a binary element having a first of the possible binary values;

if the previously decoded binary element has a value of y, decoding the current state interval as a pair of binary elements, wherein the first element of the pair has a second of the possible binary values and the second element of the pair has a value of either x or y depending on whether the current state interval is a b state interval or a c state interval.

5. A system for electronic communications using electrical power lines in a building, comprising:

a plurality of components that are connected for communications among themselves through the electrical power lines;

a control transmitter associated with at least one of the components for transmitting a data stream over the electrical power lines as a series of state changes, the data stream having a sequence of binary elements that each have one of two possible binary values represented herein as x and y, wherein each binary element is immediately preceded by another binary element and immediately followed by yet another binary element;

wherein the control transmitter is configured to encode the binary elements as a series of state intervals on the power lines by encoding at least some pairs of binary elements as single state intervals selected from three different available state intervals;

wherein the a state interval is approximately equal to a predetermined duration;

wherein the b state interval is longer than the a state interval; and wherein the c state interval is longer than the b state interval.

6. A system as recited in claim 5, wherein:

the b state interval is approximately equal to 1½ times the predetermined duration;

the c state interval is approximately equal to 2 times the predetermined duration.

7. A system as recited in claim 5, wherein:

x equals 0 and y equals 1;

the first of the possible binary values equals 1;

the second of the possible binary values equals 0;

the b state interval is approximately equal to 1½ times the predetermined duration;

the c state interval is approximately equal to 2 times the predetermined duration.

8. A system for electronic communications using electrical power lines in a building, comprising:

a plurality of components that are connected for communications among themselves through the electrical power lines;

a control receiver associated with at least one of the components for receiving a data stream over the electrical power lines as a series of state changes, the data stream having a sequence of binary elements that each have one of two possible binary values represented herein as x and y;

wherein the control receiver is configured to decode individual binary elements from a series of a, b, and c state intervals on the electrical power lines as follows:

if the previously decoded binary element has a value of x, decoding the current state interval as a binary element having a value of x or y depending on whether the current state interval is an a state interval or a b state interval;

if the previously decoded binary element has a value of y and the current state interval is an a state interval, decoding the current state interval as a binary element having a first of the possible binary values;

if the previously decoded binary element has a value of y, decoding the current state interval as a pair of binary elements, wherein the first element of the pair has a second of the possible binary values and the second element of the pair has a value of either x or y depending on whether the current state interval is a b state interval or a c state interval.

9. A system as recited in claim 8, wherein the control receiver is further configured to detect a d state interval on the power lines to signal the beginning of the data stream, wherein the d state interval is longer than any one of the a, b, and c state intervals.

10. A system as recited in claim 8, wherein x equals 0 and y equals 1.

11. A system for electronic communications using electrical power lines in a building, comprising:

a plurality of components that are connected for communications among themselves through the electrical power lines;

a control receiver associated with at least one of the components for receiving a data stream over the electrical power lines as a series of state changes, the data stream having a sequence of binary elements that each have one of two possible binary values represented herein as x and y;

wherein the control receiver is configured to decode individual binary elements from a series of a, b, and c state intervals on the electrical power lines as follows:

if the previously decoded binary element has a value of x, decoding the current state interval as a binary element having a value of x or y depending on whether the current state interval is an a state interval or a b state interval;

if the previously decoded binary element has a value of y and the current state interval is an a state interval, decoding the current state interval as a binary element having a first of the possible binary values;

if the previously decoded binary element has a value of y, decoding the current state interval as a pair of binary elements, wherein the first element of the pair has a second of the possible binary values and the second element of the pair has a value of either x or y depending on whether the current state interval is a b state interval or a c state interval;

wherein the a state interval is approximately equal to a predetermined duration;

wherein the b state interval is longer than the a state interval; and wherein the c state interval is longer than the b state interval.

12. A system as recited in claim 11, wherein:
the b state interval is approximately equal to 1½ times the predetermined duration;
the c state interval is approximately equal to 2 times the predetermined duration.

13. A system as recited in claim 11, wherein:
x equals 0 and y equals 1;
the first of the possible binary values equals 1;
the second of the possible binary values equals 0;
the b state interval is approximately equal to 1½ times the predetermined duration;
the c state interval is approximately equal to 2 times the predetermined duration.

14. A method of communicating a data stream using a transmission medium capable of different state intervals, the data stream having a sequence of binary elements that each have one of two possible binary values represented herein as x and y, wherein each binary element is immediately preceded by another binary element and immediately followed by yet another binary element, the method comprising the following steps:
encoding the binary elements as a series of state intervals on the transmission medium by encoding at least some pairs of the binary elements as single state intervals selected from different available state intervals.

15. A method of communicating a data stream using a transmission medium capable of different state intervals, the data stream having a sequence of binary elements that each have one of two possible binary values represented herein as x and y, wherein each binary element is immediately preceded by another binary element and immediately followed by yet another binary element, the method comprising the following steps:
encoding the binary elements as a series of a, b, and c state intervals on the transmission medium as follows:
if the binary element immediately preceding a current binary element has a value of x, encoding the current binary element as an a or b state interval depending on the value of the current binary element;
if the binary element immediately preceding the current binary element has a value of y and the current binary element has a value equal to a first of the possible binary values, encoding the current binary element as an a state interval;
if the binary element immediately preceding the current binary element has a value of y and the current binary element has a value equal to a second of the possible binary values, encoding the current binary element and the immediately following binary element as a b or c state interval depending on the value of said immediately following binary element.

16. A method as recited in claim 15, wherein an initial binary element is not preceded by another binary element, further comprising an additional step of assuming that there is a binary element having value y immediately preceding the initial binary element.

17. A method as recited in claim 15, further comprising an additional step of imposing a d state interval on the transmission medium immediately preceding the data stream to signal the beginning of the data stream, wherein the d state interval is longer than any one of the a, b, and c state intervals.

18. A method as recited in claim 15, wherein x equals 0 and y equals 1.

19. A method as recited in claim 15, wherein:
the first of the possible binary values equals 1;
the second of the possible binary values equals 0.

20. A method as recited in claim 15, wherein:
x equals 0 and y equals 1;
the first of the possible binary values equals 1;
the second of the possible binary values equals 0.

21. A method as recited in claim 15, further comprising decoding individual binary elements from the state intervals as follows:
if the previously decoded binary element has a value of x, decoding the current state interval as a binary element having a value of x or y depending on whether the current state interval is an a state interval or a b state interval;
if the previously decoded binary element has a value of y and the current state interval is an a state interval, decoding the current state interval as a binary element having a first of the possible binary values;
if the previously decoded binary element has a value of y, decoding the current state interval as a pair of binary elements, wherein the first element of the pair has a second of the possible binary values and the second element of the pair has a value of either x or y depending on whether the current state interval is a b state interval or a c state interval.

22. A method of communicating a data stream using a transmission medium capable of different state intervals, the data stream having a sequence of binary elements that each have one of two possible binary values represented herein as x and y, wherein each binary element is immediately preceded by another binary element and immediately followed by yet another binary element, the method comprising the following steps:
encoding the binary elements as a series of a, b, and c state intervals on the transmission medium as follows:
if the binary element immediately preceding a current binary element has a value of x, encoding the current binary element as an a or b state interval depending on the value of the current binary element;
if the binary element immediately preceding the current binary element has a value of y and the current binary element has a value equal to a first of the possible binary values, encoding the current binary element as an a state interval;
if the binary element immediately preceding the current binary element has a value of y and the current binary element has a value equal to a second of the possible binary values, encoding the current binary element and the immediately following binary element as a b or c state interval depending on the value of said immediately following binary element;
wherein the a state interval is approximately equal to a predetermined duration;
wherein the b state interval is longer than the a state interval; and
wherein the c state interval is longer than the b state interval.

23. A method as recited in claim 22, wherein:
the b state interval is approximately equal to 1½ times the predetermined duration;
the c state interval is approximately equal to 2 times the predetermined duration.

24. A method as recited in claim 22, wherein:
x equals 0 and y equals 1;

the b state interval is approximately equal to 1½ times the predetermined duration;

the c state interval is approximately equal to 2 times the predetermined duration.

25. A method as recited in claim 22, wherein:

x equals 0 and y equals 1;

the first of the possible binary values equals 1;

the second of the possible binary values equals 0;

the b state interval is approximately equal to 1½ times the predetermined duration;

the c state interval is approximately equal to 2 times the predetermined duration.

26. A method of communicating a data stream using a transmission medium capable of different state intervals, the data stream having a sequence of binary elements that each have one of two possible binary values represented herein as x and y, the method comprising the following steps:

decoding individual binary elements from a series of a, b, and c state intervals on the transmission medium as follows:

if the previously decoded binary element has a value of x, decoding the current state interval as a binary element having a value of x or y depending on whether the current state interval is an a state interval or a b state interval;

if the previously decoded binary element has a value of y and the current state interval is an a state interval, decoding the current state interval as a binary element having a first of the possible binary values;

if the previously decoded binary element has a value of y, decoding the current state interval as a pair of binary elements, wherein the first element of the pair has a second of the possible binary values and the second element of the pair has a value of either x or y depending on whether the current state interval is a b state interval or a c state interval.

27. A method as recited in claim 26, wherein an initial binary element is not preceded by another binary element, further comprising an additional step of assuming that there is a binary element having value y immediately preceding the initial binary element.

28. A method as recited in claim 26, further comprising an additional step of detecting a d state interval on the transmission medium to signal the beginning of the data stream, wherein the d state interval is longer than any one of the a, b, and c state intervals.

29. A method as recited in claim 26, wherein x equals 0 and y equals 1.

30. A method as recited in claim 26, wherein:

the first of the possible binary values equals 1;

the second of the possible binary values equals 0.

31. A method as recited in claim 26, wherein:

x equals 0 and y equals 1;

the first of the possible binary values equals 1;

the second of the possible binary values equals 0.

32. A method of communicating a data stream using a transmission medium capable of different state intervals, the data stream having a sequence of binary elements that each have one of two possible binary values represented herein as x and y, the method comprising the following steps:

decoding individual binary elements from a series of a, b, and c state intervals on the transmission medium as follows:

if the previously decoded binary element has a value of x, decoding the current state interval as a binary element having a value of x or y depending on whether the current state interval is an a state interval or a b state interval;

if the previously decoded binary element has a value of y and the current state interval is an a state interval, decoding the current state interval as a binary element having a first of the possible binary values;

if the previously decoded binary element has a value of y, decoding the current state interval as a pair of binary elements, wherein the first element of the pair has a second of the possible binary values and the second element of the pair has a value of either x or y depending on whether the current state interval is a b state interval or a c state interval;

wherein the a state interval is approximately equal to a predetermined duration;

wherein the b state interval is longer than the a state interval; and wherein the c state interval is longer than the b state interval.

33. A method as recited in claim 32, wherein:

the b state interval is approximately equal to 1½ times the predetermined duration;

the c state interval is approximately equal to 2 times the predetermined duration.

34. A method as recited in claim 32, wherein:

x equals 0 and y equals 1;

the b state interval is approximately equal to 1½ times the predetermined duration;

the c state interval is approximately equal to 2 times the predetermined duration.

35. A method as recited in claim 32, wherein:

x equals 0 and y equals 1;

the first of the possible binary values equals 1;

the second of the possible binary values equals 0;

the b state interval is approximately equal to 1½ times the predetermined duration;

the c state interval is approximately equal to 2 times the predetermined duration.

36. A method of communicating a data stream using a transmission medium capable of different state intervals, the data stream having a sequence of binary elements that each have one of the two possible binary values represented herein as x and y, wherein each binary element is immediately preceded by another binary element and immediately followed by yet another binary element, the method comprising the following steps:

encoding the binary elements as a series of a, b, and c state intervals on the transmission medium as follows:

if a current binary clement has a value of x and the binary element immediately preceding a current binary element has a value of x, encoding the current binary element as an a state interval;

if the current binary element has a value of y and the binary element immediately preceding a current binary element has a value of x, encoding the current binary element as a b state interval;

if the current binary element has a value of y and the binary element immediately preceding the current binary element has a value of y, encoding the current binary element as an a state interval;

if the current binary element has a value of x, the binary element immediately preceding the current binary element has a value of y, and the binary element immediately following the current binary element has a value of x, encoding the current binary element and the immediately following binary element as a b state interval;

if the current binary element has a value of x, the binary element immediately preceding the current binary element has a value of y, and the binary element immediately following the current binary element has a value of y, encoding the current binary element and the immediately following binary element as a c state interval.

37. A method as recited in claim 36, wherein an initial binary element is not preceded by another binary element, further comprising an additional step of assuming that there is a binary element having value y immediately preceding the initial binary element.

38. A method as recited in claim 36, further comprising an additional step of imposing a d state interval on the transmission medium immediately preceding the data stream to signal the beginning of the data stream, wherein the d state interval is longer than any one of the a, b, and c state intervals.

39. A method as recited in claim 36, further comprising decoding individual binary elements from the state intervals as follows:

if the current state interval is an a state interval and the previously decoded binary element has a value of x, decoding the current state interval as a binary element having a value of x;

if the current state interval is a b state interval and the previously decoded binary element has a value of x, decoding the current state interval as a binary element having a value of y;

if the current state interval is an a state interval and the previously decoded binary element has a value of y, decoding the current state interval as a binary element having a value of y;

if the current state interval is a b state interval and the previously decoded binary element has a value of y, decoding the current state interval as a pair of binary elements, wherein each element of the pair has a value of x;

if the current state interval is a c state interval and the previously decoded binary element has a value of y, decoding the current state interval as a pair of binary elements, wherein a first of the elements has a value of x and a second of the elements has a value of y.

40. A method of communicating a data stream using a transmission medium capable of different state intervals, the data stream having a sequence of binary elements that each have one of the two possible binary values represented herein as x and y, wherein each binary element is immediately preceded by another binary element and immediately followed by yet another binary element, the method comprising the following steps:

encoding the binary elements as a series of a, b, and c state intervals on the transmission medium as follows:

if a current binary element has a value of x and the binary element immediately preceding a current binary element has a value of x, encoding the current binary element as an a state interval;

if the current binary element has a value of y and the binary element immediately preceding a current binary element has a value of x, encoding the current binary element as a b state interval;

if the current binary element has a value of y and the binary element immediately preceding the current binary element has a value of y, encoding the current binary element as an a state interval;

if the current binary element has a value of x, the binary element immediately preceding the current binary element has a value of y, and the binary element immediately following the current binary element has a value of x, encoding the current binary element and the immediately following binary element as a b state interval;

if the current binary element has a value of x, the binary element immediately preceding the current binary element has a value of y, and the binary element immediately following the current binary element has a value of y, encoding the current binary element and the immediately following binary element as a c state interval;

wherein the a state interval is approximately equal to a predetermined duration;

wherein the b state interval is longer than the a state interval; and wherein the c state interval is longer than the b state interval.

41. A method as recited in claim 40, wherein:

the a state interval is approximately equal to a predetermined duration;

the b state interval is approximately equal to 1½ times the predetermined duration;

the c state interval is approximately equal to 2 times the predetermined duration.

42. A method of communicating a data stream using a transmission medium capable of different state intervals, the data stream having a sequence of binary elements that each have one of two possible binary values represented herein as x and y, the method comprising the following steps:

decoding individual binary elements from a series of a, b, and c state intervals on the transmission medium as follows:

if the current state interval is an a state interval and the previously decoded binary element has a value of x, decoding the current state interval as a binary element having a value of x;

if the current state interval is a b state interval and the previously decoded binary element has a value of x, decoding the current state interval as a binary element having a value of y;

if the current state interval is an a state interval and the previously decoded binary element has a value of y, decoding the current state interval as a binary element having a value of y;

if the current state interval is a b state interval and the previously decoded binary element has a value of y, decoding the current state interval as a pair of binary elements, wherein each element of the pair has a value of x;

if the current state interval is a c state interval and the previously decoded binary element has a value of y, decoding the current state interval as a pair of binary elements, wherein a first of the elements has a value of x and a second of the elements has a value of y.

43. A method as recited in claim 42, wherein an initial binary element is not preceded by another binary element, further comprising an additional step of assuming that there is a binary element having value y immediately preceding the initial binary element.

44. A method as recited in claim 42, further comprising an additional step of detecting a d state interval on the transmission medium to signal the beginning of the data stream, wherein the d state interval is longer than any one of the a, b, and c state intervals.

45. A method of communicating a data stream using a transmission medium capable of different state intervals, the data stream having a sequence of binary elements that each have one of two possible binary values represented herein as x and y, the method comprising the following steps:

decoding individual binary elements from a series of a, b, and c state intervals on the transmission medium as follows:

if the current state interval is an a state interval and the previously decoded binary element has a value of x, decoding the current state interval as a binary element having a value of x;

if the current state interval is a b state interval and the previously decoded binary element has a value of x, decoding the current state interval as a binary element having a value of y;

if the current state interval is an a state interval and the previously decoded binary element has a value of y, decoding the current state interval as a binary element having a value of y;

if the current state interval is a b state interval and the previously decoded binary element has a value of y, decoding the current state interval as a pair of binary elements, wherein each element of the pair has a value of x;

if the current state interval is a c state interval and the previously decoded binary element has a value of y, decoding the current state interval as a pair of binary elements, wherein a first of the elements has a value of x and a second of the elements has a value of y;

wherein the a state interval is approximately equal to a predetermined duration;

wherein the b state interval is longer than the a state interval; and wherein the c state interval is longer than the b state interval.

46. A method as recited in claim 45, wherein:

the b state interval is approximately equal to 1½ times the predetermined duration;

the c state interval is approximately equal to 2 times the predetermined duration.

47. A computer-readable storage medium having instructions for communicating a data stream using a transmission medium capable of different state intervals, the data stream having a sequence of binary elements that each have one of the two possible binary values represented herein as x and y, wherein each binary element is immediately preceded by another binary element and immediately followed by yet another binary element, the instructions being executable to encode the binary elements as a series of a, b, and c state intervals on the transmission medium by performing steps comprising:

if a current binary element has a value of x and the binary element immediately preceding a current binary element has a value of x, encoding the current binary element as an a state interval;

if the current binary element has a value of y and the binary element immediately preceding a current binary element has a value of x, encoding the current binary element as a b state interval;

if the current binary element has a value of y and the binary element immediately preceding the current binary element has a value of y, encoding the current binary element as an a state interval;

if the current binary element has a value of x, the binary element immediately preceding the current binary element has a value of y, and the binary element immediately following the current binary element has a value of x, encoding the current binary element and the immediately following binary element as a b state interval;

if the current binary element has a value of x, the binary element immediately preceding the current binary element has a value of y, and the binary element immediately following the current binary element has a value of y, encoding the current binary element and the immediately following binary element as a c state interval;

wherein:

the a state interval is approximately equal to a predetermined duration;

the b state interval is longer than the a state interval;

the c state interval is longer than the b state interval.

48. A computer-readable storage medium as recited in claim 47, wherein the predetermined duration is equal to the reciprocal of the baud rate of the transmission medium and wherein:

the b state interval is approximately equal to 1½ times the predetermined duration;

the c state interval is approximately equal to 2 times the predetermined duration.

49. A computer-readable storage medium having instructions for communicating a data stream using a transmission medium capable of different state intervals, the data stream having a sequence of binary elements that each have one of the two possible binary values represented herein as x and y, wherein each binary element is immediately preceded by another binary element and immediately followed by yet another binary element, the instructions being executable to decode individual binary elements from a series of a, b, and c state intervals on the transmission medium by performing steps comprising:

if the current state interval is an a state interval and the previously decoded binary element has a value of x, decoding the current state interval as a binary element having a value of x;

if the current state interval is a b state interval and the previously decoded binary element has a value of x, decoding the current state interval as a binary element having a value of y;

if the current state interval is an a state interval and the previously decoded binary element has a value of y, decoding the current state interval as a binary element having a value of y;

if the current state interval is a b state interval and the previously decoded binary element has a value of y, decoding the current state interval as a pair of binary elements, wherein each element of the pair has a value of x;

if the current state interval is a c state interval and the previously decoded binary element has a value of y, decoding the current state interval as a pair of binary elements, wherein a first of the elements has a value of x and a second of the elements has a value of y;

wherein:

the a state interval is approximately equal to a predetermined duration;

the b state interval is longer than the a state interval;

the c state interval is longer than the b state interval.

50. A computer-readable storage medium in claim 49, wherein the predetermined duration is equal to the reciprocal of the baud rate of the transmission medium and wherein:

the b state interval is approximately equal to 1½ times the predetermined duration;

the c state interval is approximately equal to 2 times the predetermined duration.

* * * * *